United States Patent [19]

Nozuyama et al.

[11] Patent Number: 5,631,910
[45] Date of Patent: May 20, 1997

[54] INFORMATION PROCESSING SYSTEM PROVIDED WITH SELF-DIAGNOSING CIRCUIT AND THE SELF-DIAGNOSING METHOD THEREFOR

[75] Inventors: Yasuyuki Nozuyama, Tokyo; Tsuneaki Kudou, Yokohama, both of Japan

[73] Assignee: Kabushiki Kaisha Toshiba, Kawasaki, Japan

[21] Appl. No.: 243,517

[22] Filed: May 16, 1994

Related U.S. Application Data

[63] Continuation of Ser. No. 717,349, Jun. 18, 1991, abandoned.

[30] Foreign Application Priority Data

Jun. 18, 1990 [JP] Japan .................................. 2-157493
Jun. 7, 1991 [JP] Japan .................................. 3-136285

[51] Int. Cl.$^6$ .................................................. G06F 11/00
[52] U.S. Cl. .................................. 371/22.1; 395/183.16
[58] Field of Search .................................. 371/21.6, 22.1; 365/184.01, 183.11

[56] References Cited

U.S. PATENT DOCUMENTS

| | | | |
|---|---|---|---|
| 4,785,416 | 11/1988 | Stringer | 371/27 |
| 5,018,145 | 5/1991 | Kikuchi et al. | 371/27 |
| 5,127,010 | 6/1992 | Satoh | 371/27 |

OTHER PUBLICATIONS

Digital Logic and Computer Design by M. Morris Mano ©1979 by Prentice-Hall Inc., pp. 510, 511.

*Primary Examiner*—Vincent P. Canney
*Attorney, Agent, or Firm*—Oblon, Spivak, McClelland, Maier & Neustadt, P.C.

[57] ABSTRACT

An information processing system composed of a plurality of circuit blocks operative in an normal operation mode and in a self-diagnosis mode comprises: a clock signal generating circuit for generating a basic clock signal in the normal operation mode, and a first clock signal with a period. N times (N=2, 3, ...) as long as that of the basic clock signal and a second clock signal out of phase from the first clock signal by a delay less than one cycle of the first clock signal in the self-diagnosis mode; a memory for storing microinstructions for self-diagnosis operative in synchronism with the basic clock signal in the normal operation mode, and in synchronism with the first clock signal in the self-diagnosis mode; a decoder for inputting and decoding the mlcroinstructions for self-diagnosis stored in the memory; a test data generating circuit for generating test data in accordance with the decoded results obtained by the decoder in synchronism with the first clock signal at the self-diagnosis mode; first type circuit blocks operative in synchronism with the basic clock in the normal operation mode, for storing test data generated by said test data generating means In synchronism with the second clock and outputting test data therein In synchronism with the first clock In the self-diagnosis mode; second type circuit blocks for outputting output data corresponding to the test data provided in synchronism with the basic clock signal in the normal operation mode, and in synchronism with the first clock in the self-diagnosis mode; and a signature compressing circuit for inputting the test resultant data outputted from the circuit blocks to diagnose the operation of the circuit blocks, in synchronism with the second clock signal in the self-diagnosis mode.

12 Claims, 12 Drawing Sheets

INFORMATION PROCESSING SYSTEM PROVIDED WITH SELF-DIAGNOSING CIRCUIT AND THE SELF-DIAGNOSING METHOD THEREFOR

This application is a continuation of application Ser. No. 07/717,349, filed on Jun. 18, 1991, now abandoned.

BACKGROUND OF THE INVENTION

1. Field of the Invention

The present invention relates to an information processing system provided with a self-diagnosing circuit, and more specifically to a self-diagnosing circuit for an information processing system controlled in accordance with microinstructions, which is particularly suitable for accurately evaluating AC performance of circuit blocks to be tested.

2. Description of the Prior Art

A self-test (i.e. self-diagnosis) technology has been developed to facilitate testing of circuit blocks (e.g. ROMs) formed in a large scale integrated circuit. In this self-test method, test data is self-generated and the test results are compressed for analysis (referred to as signature (test result) analysis). More specifically a test data generating circuit such as a linear feedback shift register (referred to as an LFSR) supplies test data in sequence to an objective circuit block to be tested in response to an external command, and then outputs the results from the circuit block which are then stored in a signature compressing circuit composed of an LFSR for signature compression. After a series of the above-mentioned operation has been executed, the compressed test results are compared with a previously prepared expected value for judging whether the circuit block is good or faulty.

FIG. 1 shows a CISC (Complex Instruction Set Computer) type microprocessor by way of an example to which the above-mentioned self-test can be applied. In this drawing, an objective circuit blocks 104 to be self-tested is shown, a signature compressing circuit 106 for storing the test results is also shown, and a test data generating circuit 105 is shown. All of these circuits are connected to an internal bus 101 in parallel. Further, a μROM 102 for storing a self-testing microprogram 102, a microinstruction register 130 for storing a microinstruction to be executed, and a microdecoder 103 for decoding a microinstruction stored in the microinstruction register 130 are all connected in series. Further, the decoded microinstructions are provided to the objective circuit blocks 104 and the signature compressing circuit 106.

In the microprocessor shown in FIG. 1, a plurality of circuit blocks 104 interconnected through the internal bus 101 are self-tested by the test data generating circuit 105 and the signature compressing circuit 106 also connected to the internal bus 101. The plural circuit blocks 104 are controlled by control signals obtained by decoding microinstructions stored at the self-testing microinstruction program storing area in the μROM 102 through the microinstruction decoder 103. Further, the test data generating circuit 105 and the signature compressing circuit 106 are also controlled by control signals obtained by similarly decoding microinstructions.

As described above, it is possible to systematically execute plural self-tests to a great number of circuit blocks, by controlling the structural elements required for self-test in accordance with microinstructions, in the same way as when the objective circuit blocks 104 to be tested are controlled, without increasing the number of structural elements required for testing.

In the microprocessor, however, since the microinstructions executed in the normal operation mode are not necessarily optimized as testing microinstructions in general, the number of steps of test microprograms prepared by use of the normal microinstructions is very large. To overcome this problem, there exists a self-test executable microprocessor configuration as shown in FIG. 2.

In the drawing, the multiplexers 110 and a counter 111 are supplied with the output signals from a self-test control circuit 112 and a self-test control information storing ROM 113. This controls these circuits in such a way that parts of microinstructions can be provided from the counter 111 and selected by the multiplexers 110, without generating other control signals by performing the microinstructions from a μROM 107 to a microinstruction decoder 109 via the microinstruction register 108. In the microprocessor shown in FIG. 2, since the number of microprogram words required for the testing can be decreased as compared with the number that would be required in the microprocessor shown in FIG. 1, it is possible to maximize the advantage of self-testing under the microinstruction control. In the microprocessor shown in FIG. 2, there is a problem in that the relative number of structural elements required to generate self-testing control signals increases.

Other problems involved in the prior art self-diagnosing circuits which are solved by the present invention will be explained in further detail below.

There exists recently a strong need for an evaluation mechanism which can effectively collect a great deal of evaluation data related to each circuit block arranged in an ultra-large scale integrated circuit. One of the most important evaluation data units is the AC operation performance or AC speed of the respective circuit blocks. Adequate evaluation and analysis related to the supply voltage, temperature, process parameter dependence, etc. play an important role in the effective improvement of production yield and effective development of more advanced microprocessors that have a higher performance ability.

When considering the general self-test from the standpoint of effective evaluation of AC performance, the microprocessor provided with self-test function is strictly restricted with respect to an increase in circuit forming area or space, because the test circuit itself must be formed on the same chip, so that the amount of test control information is inevitably restricted. Therefore, the test data to be supplied to the respective circuit blocks may not necessarily evaluate the full AC performance. In this self-test method, however, after a series of test data has been generated, since the test result obtained by applying the test data to each objective circuit block to be tested is evaluated by a single signature, it is possible to evaluate the basic AC performance of the respective circuit blocks in a very short time period, so that this self-test method can be effectively utilized for the above-mentioned object. The AC performance of the respective circuit blocks is normally measured in accordance with a Shmoo plot technique. The Shmoo plot technique will be explained in detail in the detailed description of the embodiments.

However, in a microinstruction controlled self-test for a 32-bit CISC-type high-performance microprocessor, there is a serious problem in that it is impossible to measure the AC performance of the objective circuit blocks to be tested at operation speeds beyond the AC performance of the self-test control block. In other words, there exists a severe limitation in the AC performance measurement of the above-mentioned high-speed microprocessor, differing from any usual self-test procedures. This problem, however, will not occur in the usual self-test procedure used by a relatively simple test control logic circuit, such as that for a memory unit.

In the case of microinstruction controlled self-testing, however, since the test microprograms descriptive of the execution control are usually stored in a part of a large-scale μROM, a problem arises in that the execution speed of the self-test is determined by the AC performance of the μROM, as indicated in FIG. 3. Namely, since the maximum operation frequency of the microinstruction controlled self-test cannot exceed the AC performance of the μROM, the true AC performance of each circuit block (represented by each bar graph) is only confirmed up to the extent represented by each of the hatched parts.

As a result, there exists a problem in that, although the true AC performance of the circuit blocks 1 and 4 which are lower in operation speed than the μROM can be measured, the AC performance of the other circuit blocks 2, 3, 5, 6 and 7 which are higher in operation speed than that of the μROM cannot be measured.

In a recent CISC type microprocessor, in particular, since the number of bits output and the number of words in a μROM tend to increase, it is rather difficult to provide an operation speed for the μROM that is sufficiently higher than that of all the objective circuit blocks to be self-tested. Therefore, there is a significant possibility of the existence of circuit blocks with a higher operational speed than the μROM (e.g. the circuit block 6 in FIG. 3). Therefore the test results for the circuit blocks with a higher speed than the μROM cannot be measured by the microinstruction controlled self-test executed via the μROM. This causes another problem in that other new circuit blocks are developed without refining or improving the already-developed circuit blocks to obtain the required higher performance. In addition, the above-mentioned problem also applies to circuit blocks which have an operation speed a little lower than the μROM but whose AC performance is strongly influenced by the process parameters.

To overcome these problems, it may be possible to successively evaluate AC performance by constructing scannable microinstruction registers, test data generating circuits, and signature compressing circuits by extending the BILBO (Built-in Logic Block Observer) technique. In this method, however, since the scanning design is based on serial data transfer, in the case of recent microprocessors provided with circuit blocks with multi-bit output connected to internal busses, it takes a large amount of time to effectively execute the failure diagnosis of these circuit blocks, so that the successive evaluation method is not suitable for the recently designed multi-bit microprocessors.

Conventionally, therefore, independent failure diagnosing circuits including AC performance evaluation are provided separately from the self-testing circuits for the circuit blocks to which the microinstruction controlled self-test is applied, where necessary at any cost. In addition, in this case, since it is impossible to adopt such a peculiar method whereby diagnostic microinstruction microprograms are stored in the μROM, there is another problem in that the amount of hardware for testing inevitably increases and therefore the overall system configuration becomes rather complicated.

Moreover, there is a serious problem in that it is difficult for a conventional LSI tester to test a circuit block which can operate at a high speed. A LSI tester which can operate at a frequency of 100 MHz is required to test one of the fastest circuit blocks at present which has an access time of approximately 10 nanoseconds.

However, an LSI tester is very expensive and its measuring accuracy is not necessarily adequate.

SUMMARY OF THE INVENTION

As described above, in the conventional failure diagnosing method using the microinstruction controlled self-test and the microinstruction control logic, the measurement of the AC performance for circuit blocks to be self-tested is limited by the AC performance of the microinstruction control logic. The conventional LSI tester cannot be used in tests for very high speed circuit blocks.

Therefore it is impossible to adequately perform a self-test or a diagnostic operation for the AC performance of the circuit blocks.

With these problems in mind, therefore, the object of the present invention is to provide an information processing system provided with a self-diagnosing circuit and the self-diagnosing method therefore, which can reliably evaluate the AC performance of circuit blocks controllably operated in accordance with microinstructions.

To achieve the above-mentioned object, the present invention provides an information processing system composed of a plurality of circuit blocks operative in a normal operation mode and in a self-diagnosis mode, comprising: (a) clock signal generating means for generating a basic clock signal in the normal operation mode, and a first clock signal with a period N times (N=2, 3, ... ) as long as that of the basic clock and a second clock out of phase from the first clock signal by a delay less than one cycle of the first clock signal in the self-diagnosis mode; (b) memory means for storing microinstructions for self-diagnosis, operative in synchronism with the basic clock signal in the normal operation mode, and in synchronism with the first clock signal in the self-diagnosis mode; (c) decoding means for inputting and decoding the microinstructions for self-diagnosis stored in said memory means; (d) test data generating means for generating test data in accordance with the decoded results obtained by said decoding means in synchronism with the first clock signal at the self-diagnosis mode; (e) first type circuit blocks operative in synchronism with the basic clock signal in the normal operation mode, for storing test data generated by said test data generating means in synchronism with the second clock signal and outputting test data therein in synchronism with the first clock signal in the self-diagnosis mode; (f) second type circuit blocks for outputting output data corresponding to the test data provided in synchronism with the basic signal in the normal operation mode, and in synchronism with the first clock signal in the self-diagnosis mode; and (g) signature compressing means for inputting the test resultant data outputted from said circuit blocks to diagnose the operation of said circuit blocks, in synchronism with the second clock signal in the self-diagnosis mode.

Further, the present invention provides a method of self-diagnosing an information processing system provided with a self-diagnosing circuit, comprising: (a) a first step of reading and decoding self-testing microinstructions from memory for storing self-testing microinstructions, in response to a first clock; (b) a second step of generating test data corresponding to the microinstructions decoded at the first step from a test data generating circuit, in response to the first clock, then transferring the test data to functional blocks to be tested or transferring data stored in first type functional blocks of the functional blocks to a data compressing circuit; (c) a third step of reading out test results transferred from second type functional blocks of the functional blocks to be tested at the second step into the data compressing circuit to compress the test results in response to the second clock, and of storing test data or data derived from the test data in the first type functional blocks of the functional blocks to be tested; and (d) a cycle time of a basis clock for controlling the operation of the function blocks in a normal operation mode being 1/N times (N=2, 3, . . . ) as short as the first and second clocks, and the second clock being out of phase from the first clock by a delay less than one cycle of the first clock.

In the present invention, the microinstruction control means operates in synchronism with every cycle of the first clock signal which is N times (where N is an integer greater than one) of the basic clock signal provided from the external device in the self-diagnosis mode. Accordingly, the AC performance of the circuit blocks to be tested can be tested up to the frequency of N times of the maximum frequency of the microinstruction control means used in the normal operation mode. The output of the circuit to supply test data to the circuit blocks to be tested through the internal bus or directly is activated in synchronism with the first clock signal, and the input of the circuit blocks to receive the test result from the circuit blocks to be tested through the internal bus or directly is activated in synchronism with the second clock signal which is delayed from the first clock signal by one cycle of the first clock signal to accurately evaluate the AC performance of each circuit block to be tested. Thereby, the AC performance, AC operational speed of a plurality of the circuit blocks to be tested can be evaluated (measured) accurately up to N times of that of the microinstruction control means.

These and other objects, feature and advantages of the present invention will be more apparent from the following description of a preferred embodiment, taken in conjunction with the accompanying drawing.

BRIEF DESCRIPTION OF THE DRAWINGS

FIG. 15-1 to 15-3 are symbols for three kinds of flip-flops;

DETAILED DESCRIPTION OF THE EMBODIMENTS

Figure 4:
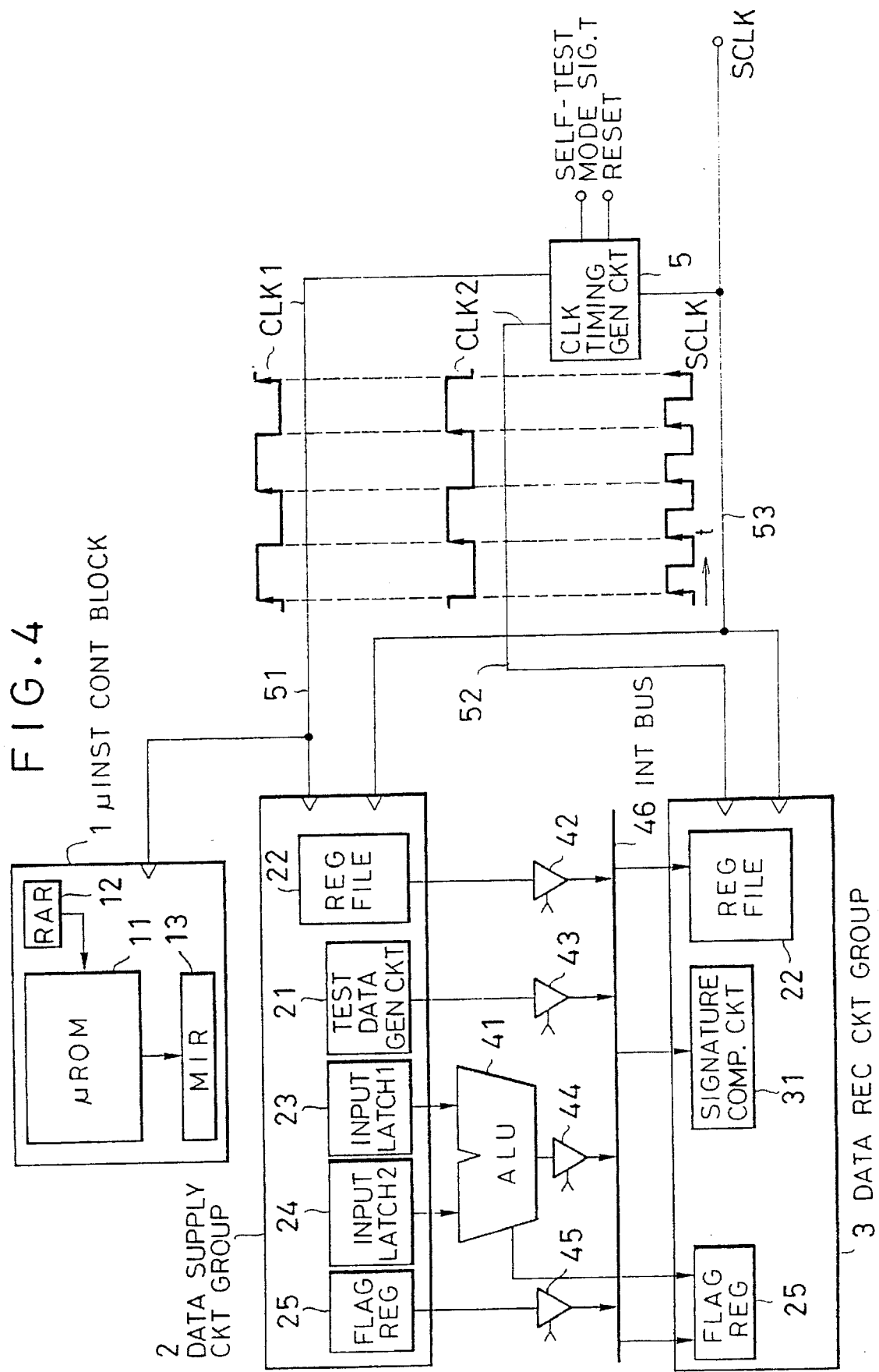
FIG. 4 is a block diagram showing an information processing system provided with a first embodiment of the self-diagnosing circuit according to the present invention.

Various embodiments of the present invention will be described hereinbelow with reference to the attached drawings:

FIG. 4 is a block diagram showing an essential portion of an information processing system including a first embodiment of a self-diagnosing circuit according to the present invention.

FIG. 4 shows a basic microprocessor which comprises a microinstruction control block 1, a single internal bus 46, a register file 22 of RAM structure connected to the internal bus 46, and an arithmetic unit (ALU) 41, and which is driven in response to a single phase system clock, in order to facilitate understanding of the gist of the present invention. Without being limited thereto, however, it is of course possible to effectively apply the self-diagnosing circuit according to the present invention to another microprocessor comprising a plurality of circuit blocks connected to plural internal buses and driven in response to two or more phase system clocks.

Prior to describing the configuration of the embodiment, the two operation modes of the embodiment of the information processing system (e.g. microprocessor) will be explained hereinbelow.

(1) Normal operation mode for executing the essential function as the information processing system.

(2) Self-test operation mode for executing the microinstruction controlled self-test operation by the information processing system (Self-test operations of different kinds can be incorporated, but are not described because these are not directly related to the gist of the present invention).

In addition to the above two operation modes, there are many information processing systems provided with a scanning operation mode. However, these systems will not be discussed herein, because this mode can be executed independently from the present invention.

The self-test operation mode can be maintained by an appropriate flip-flop (not shown) activated in response to an appropriate external start signal. If T denotes the output signal of this flip-flop, these operation modes can be defined, for instance, as follows:

T=0: Normal operation mode

T=1: Self-test operation mode

In an usual information processing system, when an external reset input signal is activated, T=0 is set to start the normal operation. In a recent information processing system provided with a self-test function, the self-test operation is started when T=1 is obtained on the basis of a combination of the external reset input signal and another appropriate signal, and T=0 is automatically attained at the end of the self-test operation, returning to the normal operation.

The configuration of the microprocessor shown in FIG. 4 will be described hereinbelow in further detail.

The microinstruction control block 1 includes a microinstruction storing ROM (μROM) 11, an address register (RAR) 12, and an output register (MIR) 13 (a microinstruction decoder is not shown). Here, the μROM 11 is a precharged type. Only a single register file 22 is provided for the actual microprocessor. In FIG. 4, however, the register file 22 is shown doubly in both a data supply circuit group 2 and a data receiving circuit group 3, for convenience in describing the operation of this embodiment. Further, signals from two input latches 23 and 24 are input to the ALU 41. Changes in various flags due to the operation of the ALU 41 are input to a flag register 25. In the same way as in the register file 22, this flag register 25 is shown doubly in both the data supply circuit group 2 and the data receiving circuit group 3, for convenience of description. However, there is only one flag register 25 in the actual circuit. In this embodiment, the register file 22 and the ALU 41 are objective circuit blocks self-tested under microinstruction control. In general, although other circuits such as shifters, arithmetic circuits, ROMs, etc. can be included in the objective circuit blocks, these circuits can be self-tested in the same way.

A test data generating circuit 21 which may be a ROM, a shift register, an LFSR, etc., generates test data for the objective circuit blocks. In general, the test data generating circuit 21 is so formed as to provide test data under a plurality of test data generation modes suitable for various circuit block tests, in such a way that any given mode can be designated by a microinstruction, for instance. The test data is narrow-sense test data for testing the data path section of the objective circuit blocks to be tested, data for initializing a microinstruction sequence (e.g. the number of loops of microinstructions, the test data generation mode and the initial value of the test data generating circuit, the initial value of a signature compressing circuit, etc.), data for initializing various flags, etc. A signature compressing circuit 31 is a circuit (parallel input linear feedback shift register (LFSR)) for compressing the resultant data of the test into a signature (final test resultant data).

In the above configuration, all the circuit blocks (except the circuits of the microinstruction control block 1) are connected to an internal bus 46, and data is output to the internal bus 46 via tristate output buffers 42 to 45. Although data can be input to these circuit blocks via the internal bus 46 for initialization, routes not directly related to the gist of the present invention are not shown, for simplification. Various control signals and activating signals applied to the respective circuit blocks or the circuit elements are generated by decoding microinstructions output from the MIR 13 through a microinstruction decoder (not shown). These signals are effective as they are to the respective circuit blocks or the circuit elements in the normal operation mode or the self-test operation mode.

The clock timing operation to control the self-test operation, which is the gist of the present invention, will be described hereinbelow. This clock timing operation enables the tests of circuit blocks with a higher AC performance than the μROM 11 to be executed reliably or correctly. For example, a clock timing generating circuit 5 for generating a clock timing signal inputs a self-test mode signal T, a reset signal RESET and a system clock (SCLK), and outputs two clock signals CLK1 and CLK2. These clock signals are supplied via two clock signal supply lines 51 and 52 to the predetermined respective circuit blocks described later. In the normal operation mode (T=0), these clock outputs are the same in period and phase as the system clock input (however, some delay exists due to one or two logical gates). On the other hand, in the self-test operation mode (T=1), the period of the clock signal CLK1 is twice as long as the system clock signal (SCLK) and the edges of the clock signal CLK1 match the rising edges of the system clock signal; and the clock signal CLK2 is out of phase with the clock signal CLK1 by a half cycle of the clock signal CLK1. The reset signal RESET serves to determine the phase of the clock signals at the self-test start.

Figure 5:
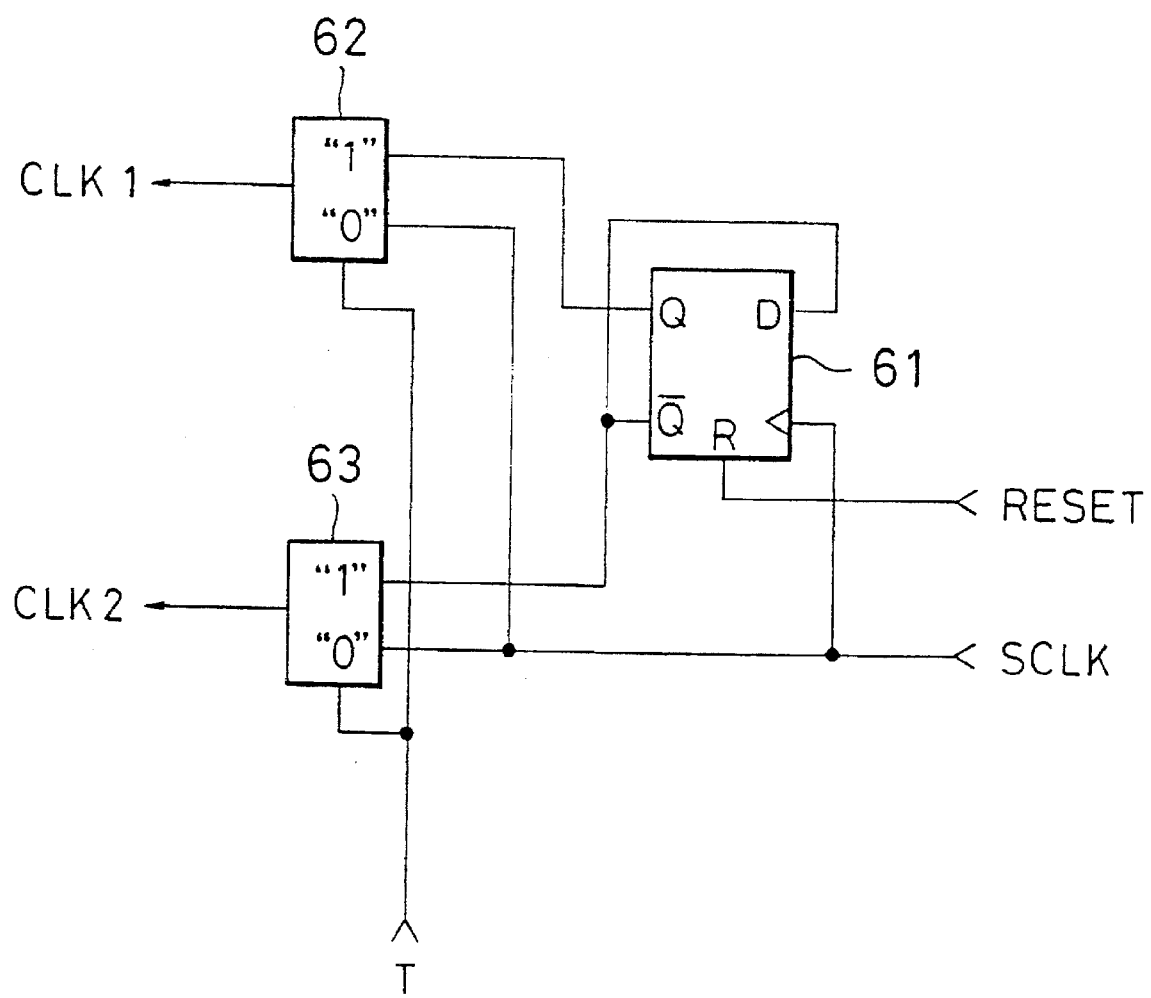
FIG. 5 is a block diagram showing a clock timing generating circuit incorporated in the information processing system shown in FIG. 4.

The clock timing generating circuit 5 can be formed by a simple circuit as shown in FIG. 5, for instance. In the drawing, a D-type flip-flop 61 is a flip-flop with a reset input. Two two-input multiplexers 62 and 63 selectively output the input signal connected to the side represented by "0" or "1" at the self-test input signal T=0 or 1, respectively. That is, the system clock signal SCLK is output via the input "0" at T=0 and the flip-flop (61) output is output via the input "1" at T=1, respectively. In the circuit as described above, the clock signal delay in the normal operation is of such an extent as can be caused by a single logical gate, without exerting a harmful influence upon the performance of the information processing system in the normal operation, thus is negligible.

Further, it is preferable to provide the clock timing generating circuit 5 at such a position that the clock input signal is not yet amplified by a buffer circuit. Further, in this embodiment, all the circuit blocks shown in FIG. 4 are assumed to change in level in synchronism with the rising edges of the respective clock inputs, respectively.

Figure 3:
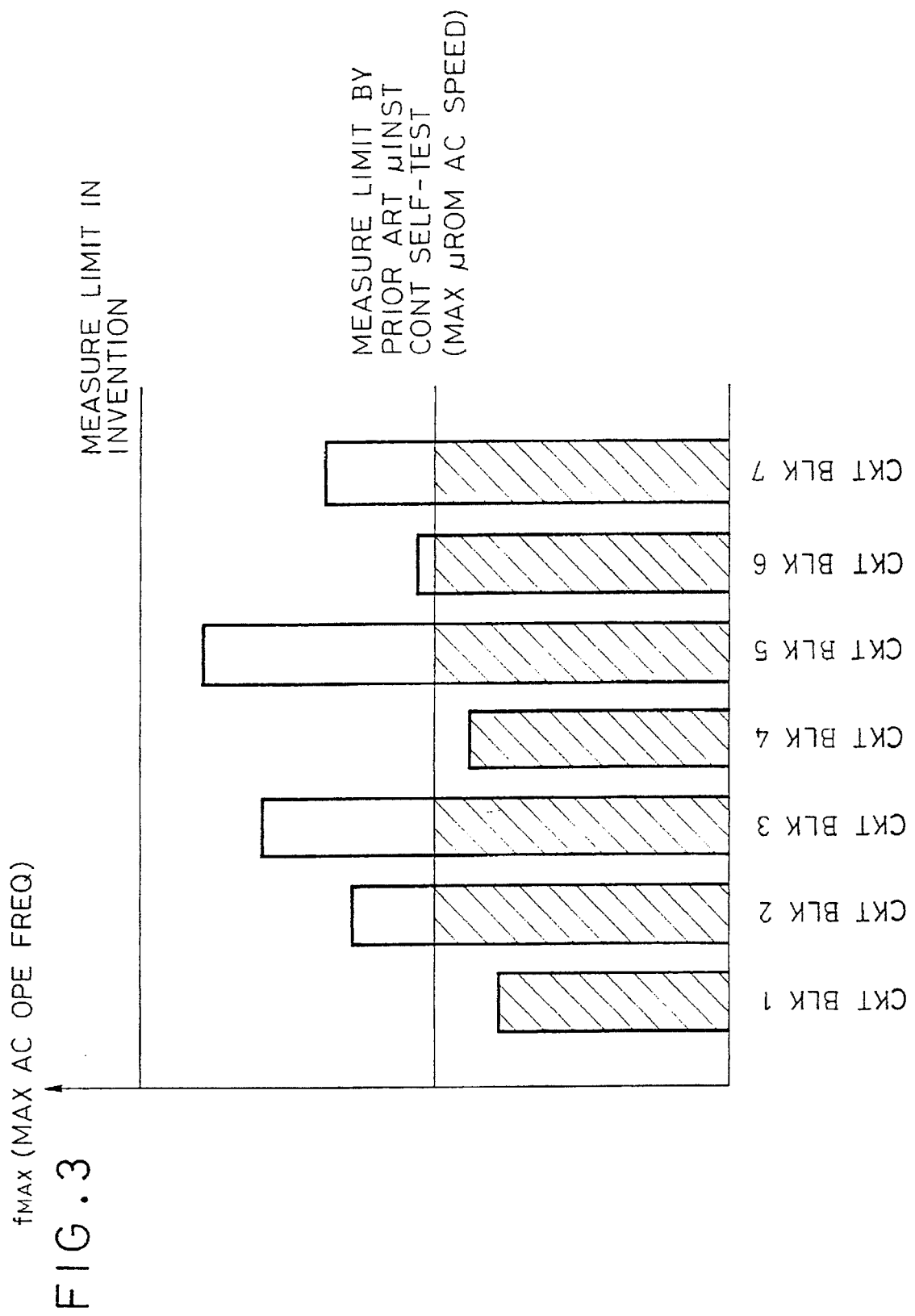
FIG. 3 is a comparative bar graph descriptive of the AC performance and the measuring limits of the respective circuit blocks within the information processing system provided with a conventional self-diagnosing circuit as shown in FIGS. 1 and 2 and a self-diagnosing circuit according to the present invention.

The feature of the present invention is that it enables the AC performance of each objective circuit block self-tested under microinstruction control to be measured up to a range in practice which sufficiently exceeds the AC performance of the microinstruction control block 1. In the case of the present embodiment, the clock signal CLK1 with a period twice as long as that of the system clock signal used for the normal operation is supplied to the microinstruction control block 1 in the self-test operation mode, in order to relax the operation timing requirement for a large scale circuit block (e.g. μROM 11) within the microinstruction control block 1 down to ½ of that in the normal operation mode. On the other hand, in the objective circuit blocks to be self-tested, other than the microinstruction control block 1 (e.g. the register file 22 and the ALU 41), the AC performance of these circuit blocks can be measured up to the twice the maximum AC performance of the microinstruction control block 1, by supplying the clocks signals CLK1 (which specifies a supply timing of test data and microinstructions) and CLK2 (which specifies a store timing of resultant data from the test operation) so as to maintain the operation timing requirement in the same way as in the normal operation mode. In the present invention, although the period of the system clock signal is merely doubled to realize the effect of the present invention in the most simplified manner, since the AC performance of the objective circuit blocks can be measured up to twice that of normal operating clock of the µROM 11, it is possible to sufficiently attain the object of the present invention in practice (as shown in FIG. 3).

In practice, the self-test for measuring the AC performance of each circuit block is executed by stepwise changing the execution frequency (the system clock frequency), and the pass/fail results dependent on the frequency form a Shmoo plot. The formed Shmoo plot clearly indicates the AC performance of the circuit block. Further, when Shmoo plots are described by changing the supply voltage as parameter, it is possible to observe the dependency of the AC performance upon the supply voltage.

The objective circuit blocks to be self tested, other than the microinstruction control block 1, are classified into two groups, the data supply circuit group 2 and the data receiving circuit group 3, to facilitate understanding of the operation of the present invention for measuring the AC performance of the objective circuit blocks. The data supplying circuit group 2 supplies data to any one of the elements of the data receiving circuit group 3 via the internal bus 46 or each circuit block in one system clock cycle in the normal operation mode. Therefore, it is also necessary to maintain this timing relationship between the two blocks in the self-test mode.

The above data consists of two kinds of test data for each circuit block and the resultant test data. The test data generating circuit 21 is included in the test data supplying circuit group 2. The register file 22 and the flag register 25 are included in the data receiving circuit group 3 for storing data obtained by a test operation, and are included in the data supply circuit group 2 for supplying the resultant data to the signature compressing circuit 3, for instance. Therefore, these circuit blocks are shown in both the circuit groups in FIG. 4, as already described.

The system clock signal SCLK is supplied to both the data supply circuit group 2 and the data receiving circuit group 3 via the clock signal supply line 53 in the normal operation mode. This is because the system clock signal should be supplied to precharged-type objective circuit block to be tested, for example the register file 22, of these circuit groups, in order to precharge these circuit blocks even in the self-test mode under the same timing requirements as in the normal operation mode, so that the AC performance under the normal operation timing can be evaluated. However, if it is necessary to reduce the clock signal skew (a time lag) between these clock signals CLK1 and CLK2, an appropriate delay element is additionally provided.

Further, the relaxation of the operation timing requirement of the AC performance for the µROM 11, for example, of the microinstruction control block 1 should be taken into account not only at the theoretical level but also at the practical circuit level. For instance, the µROM 11 is of a precharged type in this embodiment. In this case, if the RAR 12 is designed to count up every two system clock cycles in the self-test operation mode, the system clock signal SCLK supplied in the normal operation mode is provided to the µROM 11 also in the self-test operation mode, and test microinstructions are read out of the µROM 11 within a low level time of the system clock signal SCLK every two cycles so that the timing requirement in the self-test operation mode is equal to that of the normal operation mode. Accordingly, when the µROM 11 is supplied with a clock signal having a frequency more than the maximum operational frequency in the normal operation mode, the access time is insufficient, so that the µROM 11 cannot operate correctly. Therefore, where the system clock signal SCLK is used as the basic clock signal, it is necessary to generate the clock signal CLK1 with a period twice as long as the system clock signal by the clock timing generating circuit 5 and to supply the generated clock signal CLK1 to the µROM 11 in order to operate the µROM 11 beyond the AC performance obtained in the normal operation mode.

Actual measurement of the AC performance of each circuit block at sufficient accuracy in practice by combining the above-mentioned clock signals and the self-test execution (T=1) will be explained hereinbelow with reference to FIGS. 6 and 7.

Figure 6:
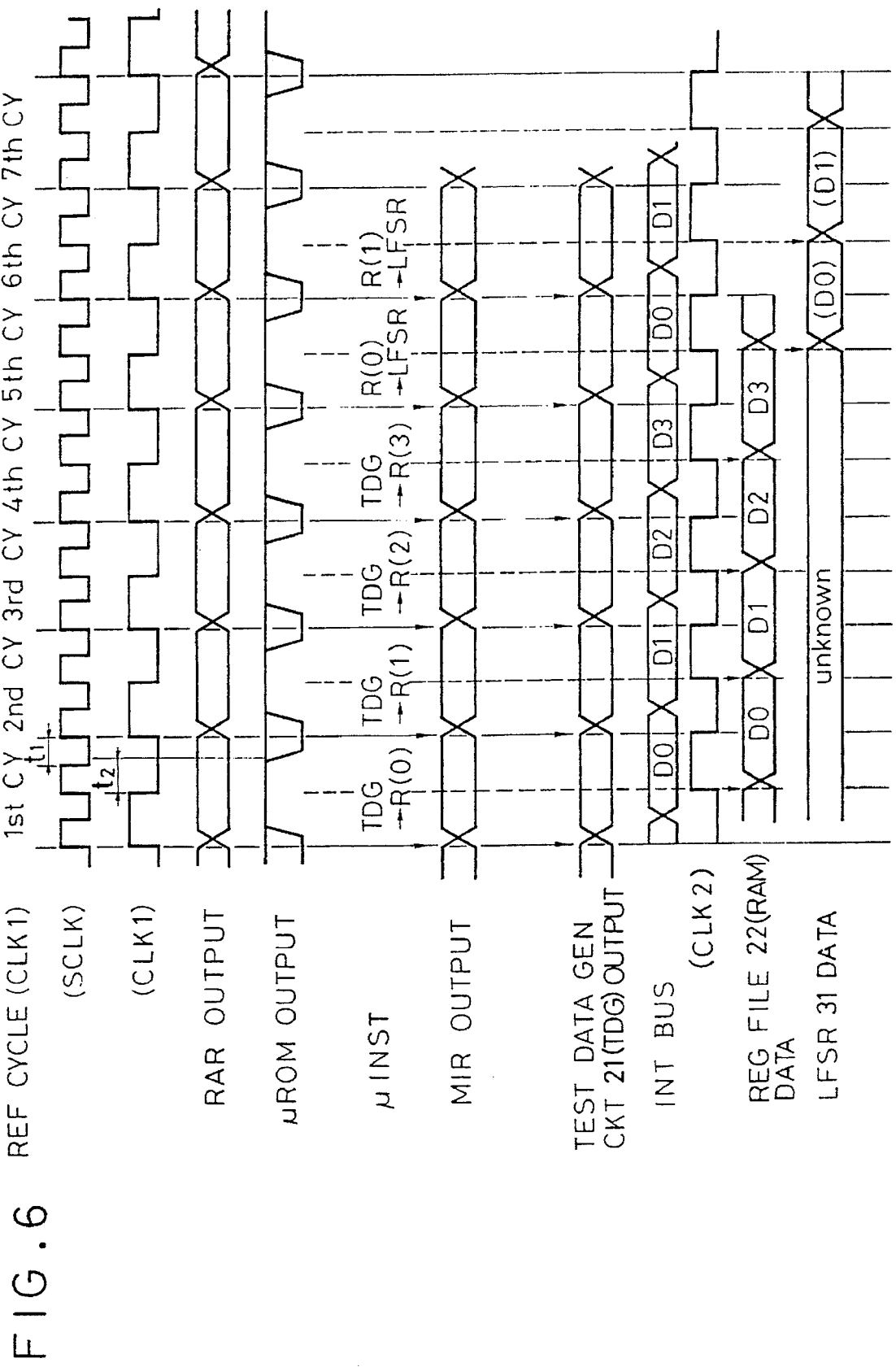
FIG. 6 is a timing chart for assistance in explaining the test operation of the register file incorporated in the information processing system shown in FIG. 4.

FIG. 6 shows an operation timing chart for assistance in explaining the self-testing of the register file (RAM) 22. In the drawing, the frequency of the system clock signal SCLK already exceeds the AC performance limit of the µROM 11 in the normal operation mode (single read operation for each system clock cycle), that is, t1<t2 as shown in the Figure, so that data cannot be correctly read out of the µROM 11. In the present embodiment, however, since the clock signal CLK1 with a period twice as long as the system clock signal SCLK is supplied to the µROM 11 and therefore the timing requirements for operation are relaxed so that data can be read once out of the µROM 11 every two system clock cycles, the data of the MIR 13 is correctly changed in level and output at every 2-system clock cycle.

In FIG. 6, in the 4 cycles on the basis of the first clock signal CLK1, appropriate test data (D0 to D3) generated by the test data generating circuit (TDG) 21 in synchronism with the clock CLK1 is written into registers (R(0)) to R(3)) with address numbers 0 to 3 of the register file 22 in synchronism with the clock signal CLK2 delayed by one cycle of the system clock signal SCLK from the clock CLK1. In the succeeding 5th and 6th cycles on the basis of the clock signal CLK1, the data (test results) in the register file 22 are read out to the internal bus 46 in synchronism with the clock signal CLK1 and compressed in the signature compressing circuit (LFSR) 31 in synchronism with the clock signal CLK2, in order to check whether the test data is correctly written or not.

As described above, in the self-test operation mode, the output of the MIR 13 is switched and data is supplied from the circuit blocks belonging to the data supplying circuit group 2 both in synchronism with the clock CLK1. On the other hand, data is received in synchronism with the clock signal CLK2 delayed by one cycle of the system clock signal SCLK from the clock signal CLK1. As a result, the AC operation timing requirement for the microinstruction control block 1 is relaxed by two cycles, so that it is possible to evaluate the AC performance of the respective circuit blocks up to twice the range beyond the limit AC performance of the µROM 11.

Figure 7:
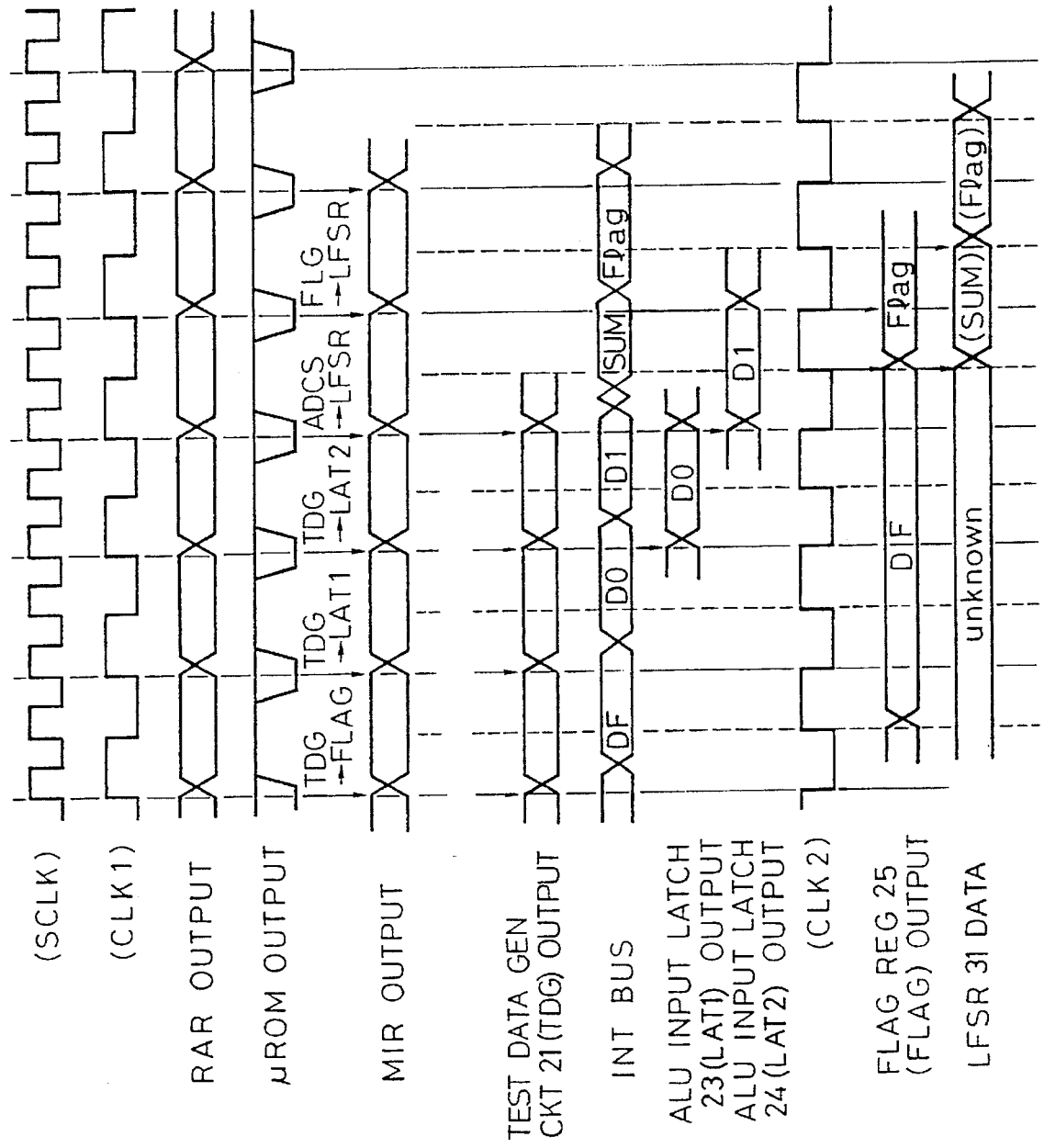
FIG. 7 is a timing chart for assistance in explaining the test operation of an arithmetic unit (ALU) incorporated in the information processing system shown in FIG. 4.

FIG. 7 is a timing chart for assistance in explaining the self test of the ALU 41 in accordance with an ADCS instruction.

The ADCS instruction indicates Addition with Carry with Flag Store. Therefore, it is necessary to check the change of the flag. That is, at the first cycle of the clock signal CLK1, an initial piece of data DF is written into the flag register (FLAG) 25 by the test data generating circuit (TDG) 21 for initialization. After that, in the 2nd and 3rd cycles, test data (D0, D1) is written into the two input latches (LAT1, LAT2) 23 and 24 of the ALU 41.

The operation results of the ALU 41, that is, the sum and the flag, are stored after one system clock cycle of the operation in the signature compressing circuit (LFSR) 31 and in the flag register 25 operating in synchronism with the clock signal CLK2. The sum is signature compressed simultaneously. Further, after one system clock cycle, the data of the flag register 25 is read out to the internal bus 46 and then compressed by the signature compressing circuit (LFSR) 31.

Therefore, the AC performance (including the flag checking) of the circuit block (ALU 41) can be measured up to twice the range of the AC operation speed of the μROM. Incidentally, more strictly it is desirable to show the test data generating circuit (TDG) 21 divided into two different circuits for initializing the flag (ROM, preferably) and for checking the data path (LFSR, preferably), respectively from the standpoint of practical test execution. However, because this is not directly related to the gist of the present invention, the test data generating circuit 21 is not divided into two different circuits in the present embodiment.

The second embodiment of the present invention will be explained hereinbelow with reference to FIG. 8, in which an information processing system provided with a self-diagnosing circuit is shown.

The configuration of the information processing system of the second embodiment is basically the same as that of the first embodiment. The difference between the two is that the system clock signal SCLK is supplied directly to the microinstruction control block 1 and the data supplying circuit group 2 in the normal operation mode and the self-test operation mode. In addition, a clock signal CLK which has the same frequency and phase as the system clock signal SCLK in the normal operation mode (T=0), and is an inverted clock signal $\overline{SCLK}$ of the system clock signal SCLK in the self-test operation mode (T=1), is supplied to the data receiving circuit group 3 via an clock inverter 15 in order to control the operation timing of these groups and the microinstruction control block 1, without providing the clock timing generating circuit 5 in the information processing system as in the first embodiment shown in FIG. 4.

One clock inverter 15 can be provided for the data receiving circuit group 3 which comprises a plurality of circuit blocks. However, since the clock inverter 15 has a simple configuration, it may be provided to each circuit block. In addition, no clock inverter 15 is provided to a circuit block. In this case, the system clock signal SCLK is supplied to the circuit block.

The above-mentioned various implementations of the clock inverter 15 are also applied to the clock signal generating circuit 5 in the first embodiment.

In the self-test operation mode (T=1), therefore, in the information processing system of this second embodiment, the system clock signal SCLK is supplied to the microinstruction control block 1 and the data supply circuit group 2, and the inversion clock signal $\overline{SCLK}$ is supplied to the data receiving circuit group 3 via the clock inverter 15.

That is, the register file 22 which is not a precharged type circuit in the data supply circuit group 2 supplies test (resultant) data to the signature compressing circuit 31 at the timing of the rising edge of the system clock signal SCLK and the signature compressing circuit 31 itself stores the test data at the timing of the falling edge of the system clock SCLK. In other words, in the self-test operation mode, the readout operation of the microinstruction is carried out at every cycle (in the period from a rising edge to the next rising edge) of the system clock signal SCLK. On the other hand, an operation from test data supply to the data storing is carried out in less than one cycle (in the period from the rising edge to the next falling edge) of the system clock signal SCLK.

Accordingly, when the period of the high level of the system clock SCLK Is equal to that of the low level, the register file 22 operates at an AC speed twice as high as the operation speed of the μROM 11, thus allowing the AC operation of the register file 22 to be correctly executed up to double the AC performance (or AC speed) of the μROM 11, resulting in an accurate evaluation of the AC performance of the register file 22 up to double the clock frequency corresponding to the AC performance of the μROM 11. Moreover, when the high level period is relatively shorter than the low level period, an AC speed more than twice as high as the operation speed of the μROM 11 can be tested.

Next, the operations described above will be more easily understood form a description of an operation between two registers in detail.

Figure 11:
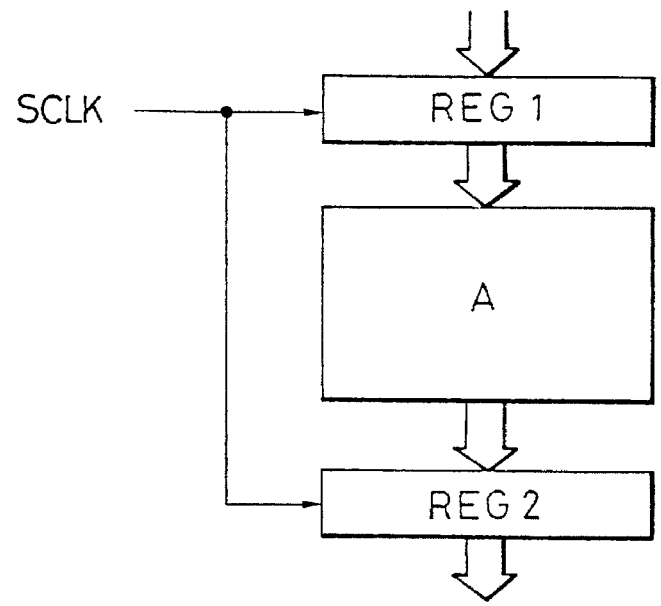
FIG. 11 is a conventional circuit diagram including registers for briefly explaining the operation of the information processing system having the self-diagnosing circuit as shown in FIG. 8.

For example, as shown in FIG. 11, a circuit block A between conventional registers REG1 and REG2 is performed within one cycle of the system clock signal SCLK.

Figure 12:
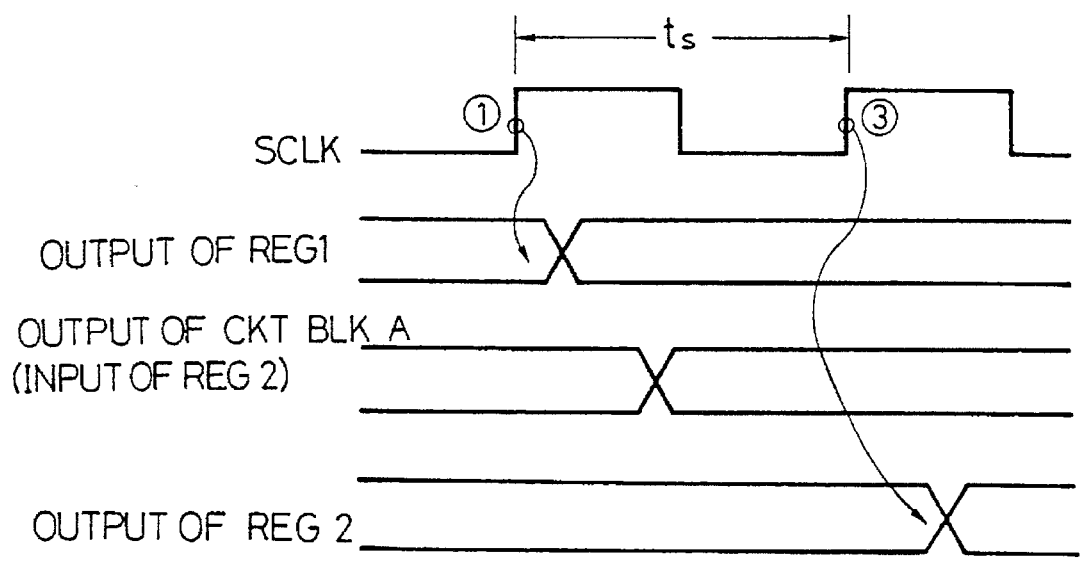
FIG. 12 is a timing chart of the operation of the circuit as shown in FIG. 11.

When the AC performance of the circuit block A is evaluated, as shown in FIG. 12, the circuit block A inputs data from the REG1 at the rising edge ① of the system clock signal SCLK, and outputs the resultant data to the REG2 which reads the data at the next rising edge ③ of the system clock signal SCLK.

Figure 13:
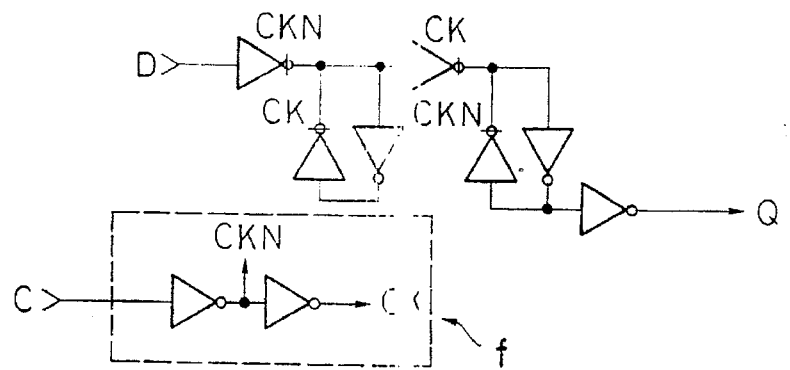
FIG. 13 is a circuit diagram of a conventional flip-flop.

Next, the frequency of the system clock signal SCLK is increased (or the period ts of the clock signal SCLK becomes shorter) between an input register REG1 of n bits using a D-type flip-flop as shown in FIG. 13 (hereinafter referred to as "F/F") which outputs data Q, and an output register REG2 of m bits of the circuit block A. This operation is performed until no correct data can be obtained at the output register REG 2. At this time, the limit frequency to obtain the correct result defines the maximum AC performance speed of the circuit block A between the registers REG1 and REG 2. When the AC speed of the circuit block A is very high, the LSI tester can not measure the AC speed of the circuit block A, as has been already explained.

Figure 1:
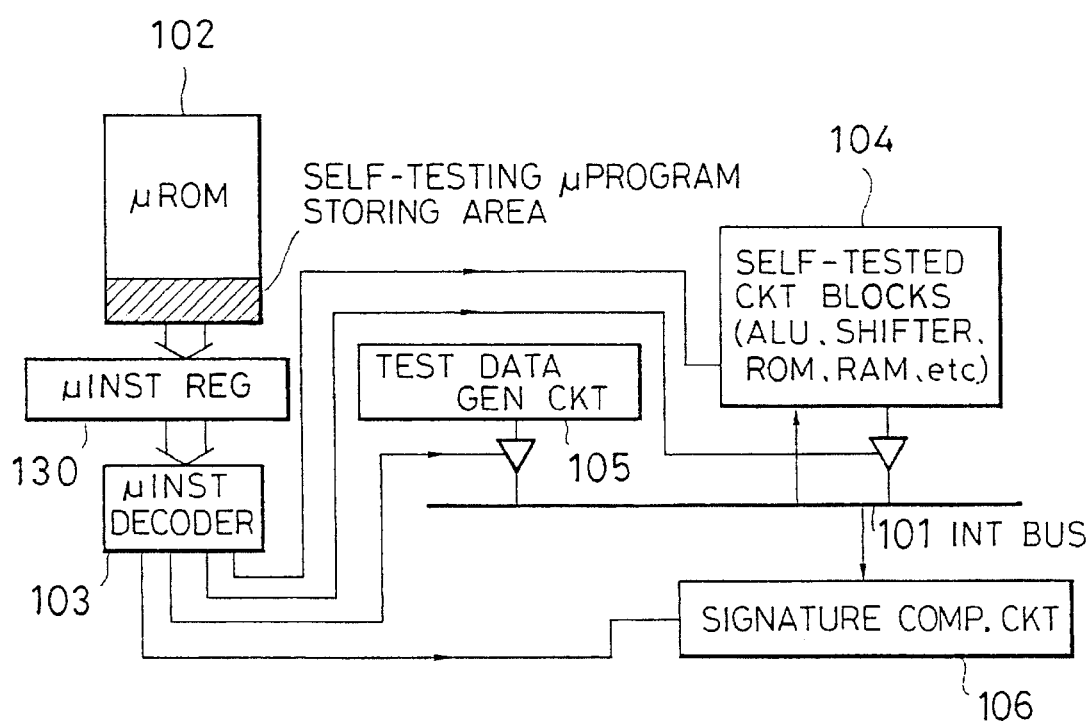
FIG. 1 is a block diagram showing an information processing system provided with a conventional self-diagnosing circuit.
Figure 2:
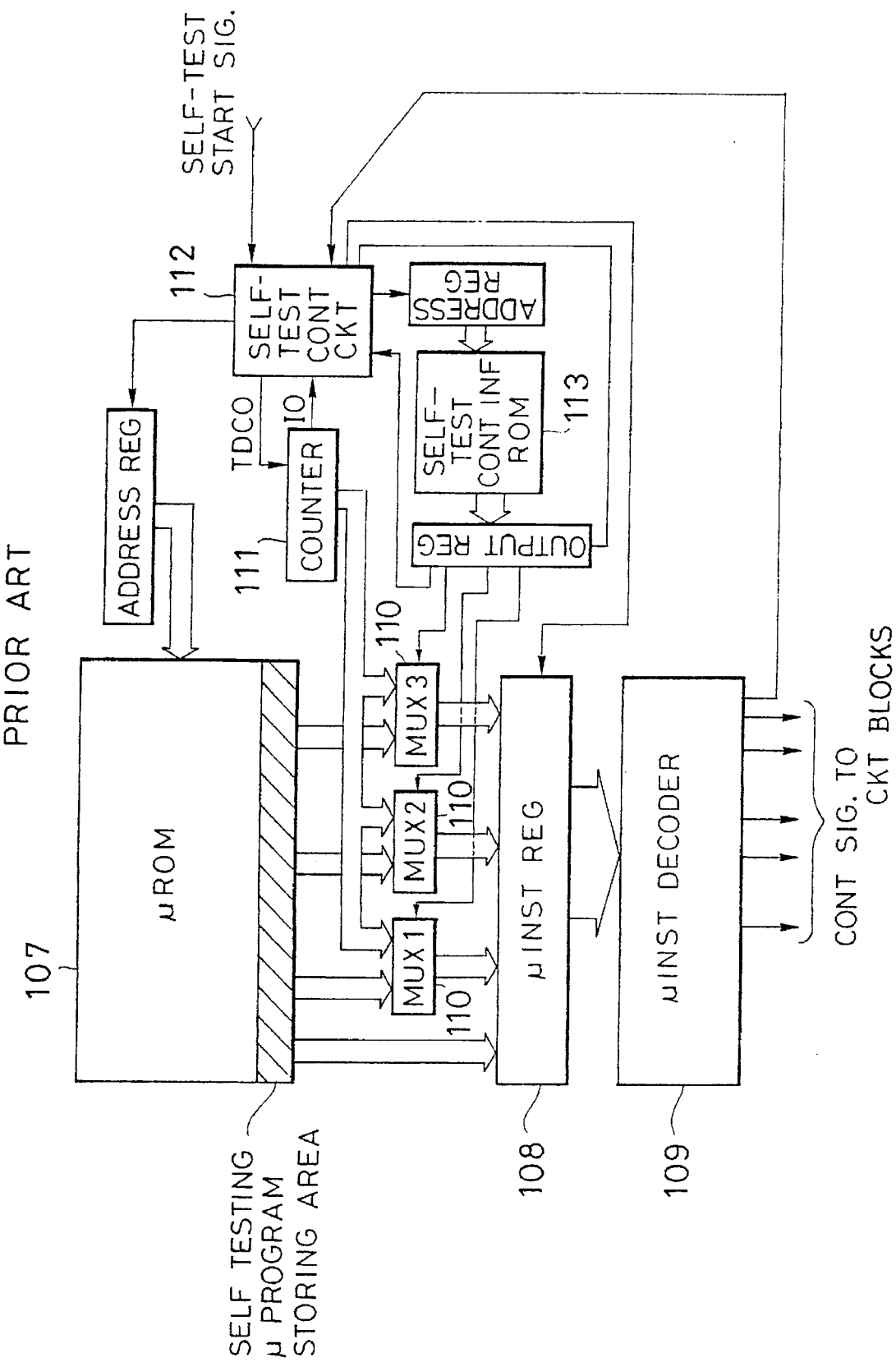
FIG. 2 is a block diagram showing an information processing system provided with another conventional self-diagnosing circuit.
Figure 14:
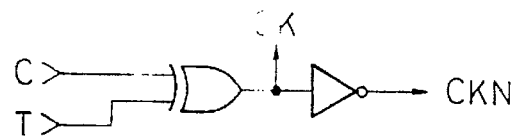
FIG. 14 is a logic diagram for control of a clock signal generation dependent on a test mode signal T.
Figure 15:
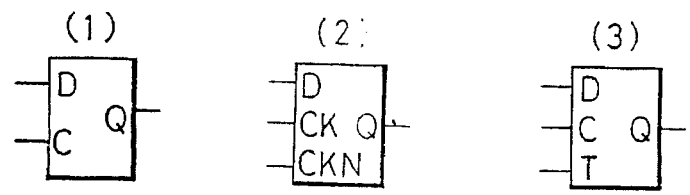

FIGS. 15-1 to 15-3 show symbols for F/Fs. FIG. 15-1 shows a circuit of F/F shown in FIG. 13. FIG. 15-2 is a F/F similar to the F/F shown In FIG. 13 in which a circuit f is eliminated from the F/F. FIG. 15-3 is a F/F in which a circuit shown in FIG. 14 is incorporated instead of the circuit f shown in FIG. 13.

Figure 16:
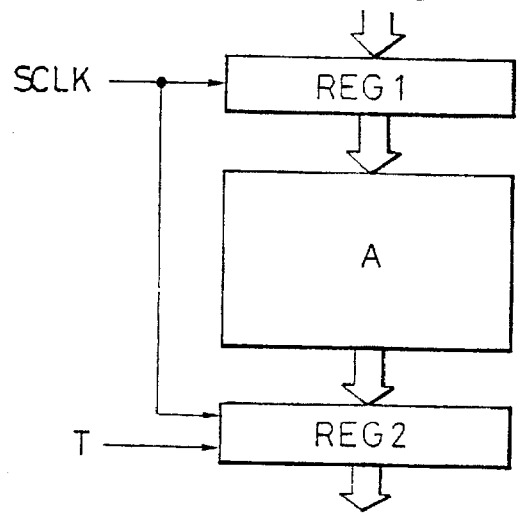
FIG. 16 is a circuit diagram for briefly explaining the operation of the information processing system having the self-diagnosing circuit as shown in FIG. 8.

Just as in the other embodiments, the test operation mode signal T=0 indicates the normal operation mode and T=1 indicates the test operation mode. As shown in FIG. 16, the F/F shown in FIG. 15-3 is used as a composing element of the REG2. In the normal operation mode (T=0), as shown in FIG. 12, test data input operation for the circuit block A transferred from the register REG1 is carried out at the rising edge ① of the system clock SCLK, the register REG2 inputs and then outputs the test results of the test operation of the circuit block A at the rising edge ③ of the next cycle.

Figure 17:
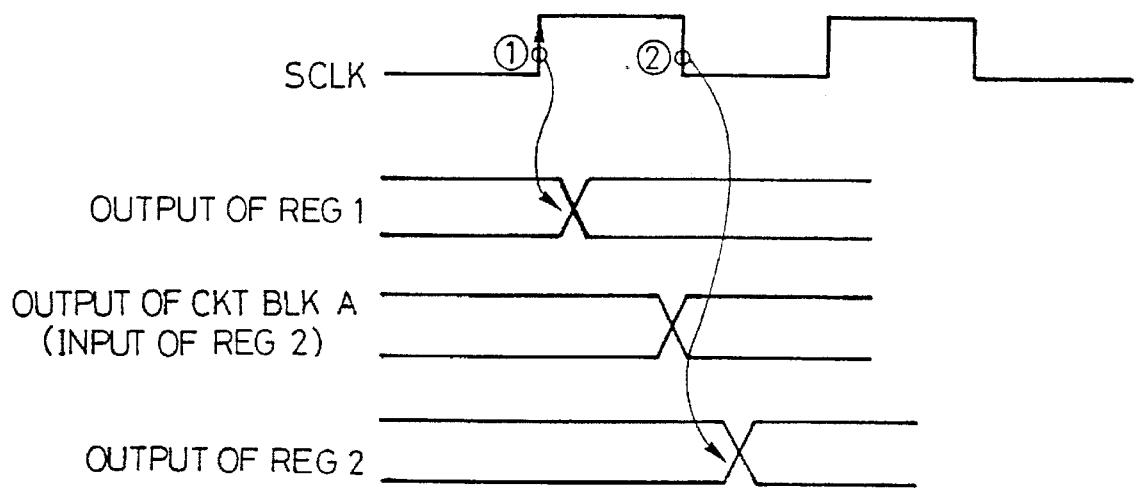
FIG. 17 is a timing chart of the information processing system as shown in FIG. 16 at a test operation mode T=1.
Figure 18:
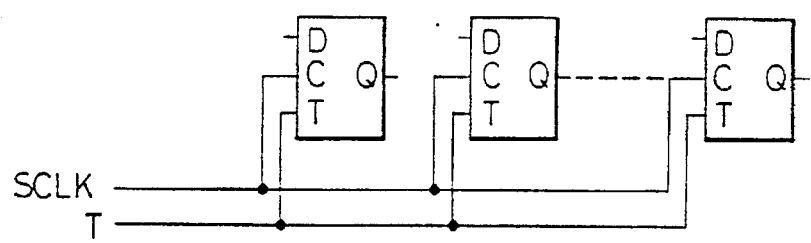
FIG. 18 is a configuration of a register REG 2 incorporated in the information processing system as shown in FIG. 16.

On the other hand, in the test operation mode (T=1), as in a timing chart shown in FIG. 17, the test data input operation is carried out at the rising edge ① of the system clock signal SCLK, the register REG2 inputs and outputs the test results at the falling edge ②. Accordingly, when the period of the high level of the system clock signal SCLK is the same as that of the low level, the AC performance of the circuit block A is evaluated with doubled frequency of the system clock signal SCLK in the test operation mode. Moreover, when the period of the high level of the system clock SCLK is shorter than that of the low level, the circuit block A can be evaluated at more than double the frequency of the system clock signal SCLK. In this case, even when the circuit block A operates at a very high speed, the AC performance of the circuit block A can be measured accurately.

The register REG 2 shown in FIG. 16 comprises the F/F shown in FIG. 15-3.

Figure 9:
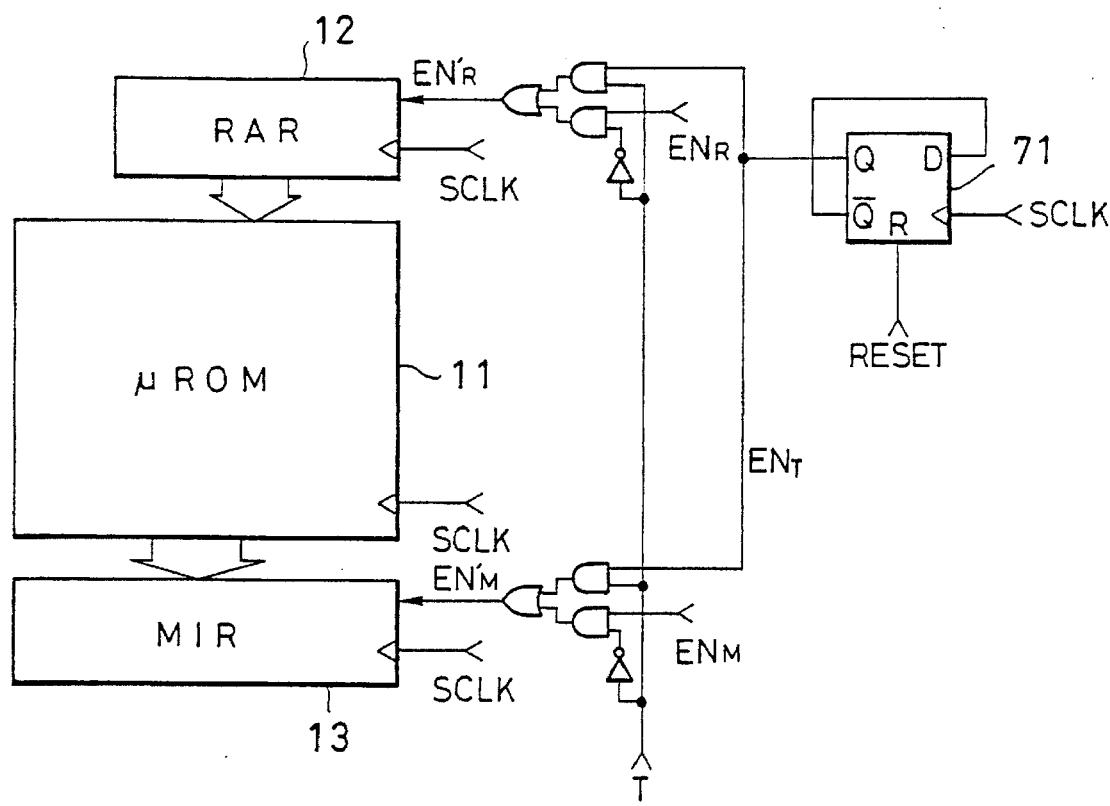
FIG. 9 is a partial block diagram for assistance in explaining the operation of the ROM which is not a precharged-type for storing test microinstructions and peripheral circuits incorporated in the information processing system provided with the fourth embodiment of the self-diagnosing circuit of the present invention.

The XOR gate shown in FIG. 14 in each F/F which makes up the REG 2 shown in FIG. 16 corresponds to the clock inverter 15 in FIG. 9, or the clock signal generating circuit 5 shown in FIG. 4.

Figure 19:
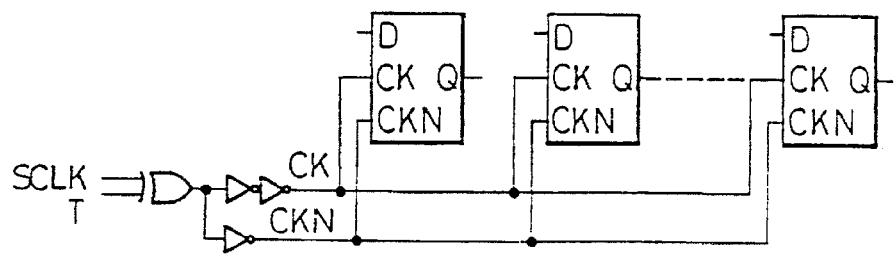
FIG. 19 is another configuration of the register REG 2 as shown in FIG. 18.

Thus, the clock inverter 15 or the clock signal generating circuit 15 can be provided to each component in the circuit block. As shown in FIG. 19, one circuit corresponding to the clock inverter 15 or the clock signal generating circuit 15 can be incorporated for the register REG 2.

The selection of the number of clock signal generating circuits described above is within the scope of the present invention.

In the second embodiment described above, the circuit block must be a circuit other than a precharged type circuit which is precharged during the high level period of the system clock signal SCLK.

Figure 8:
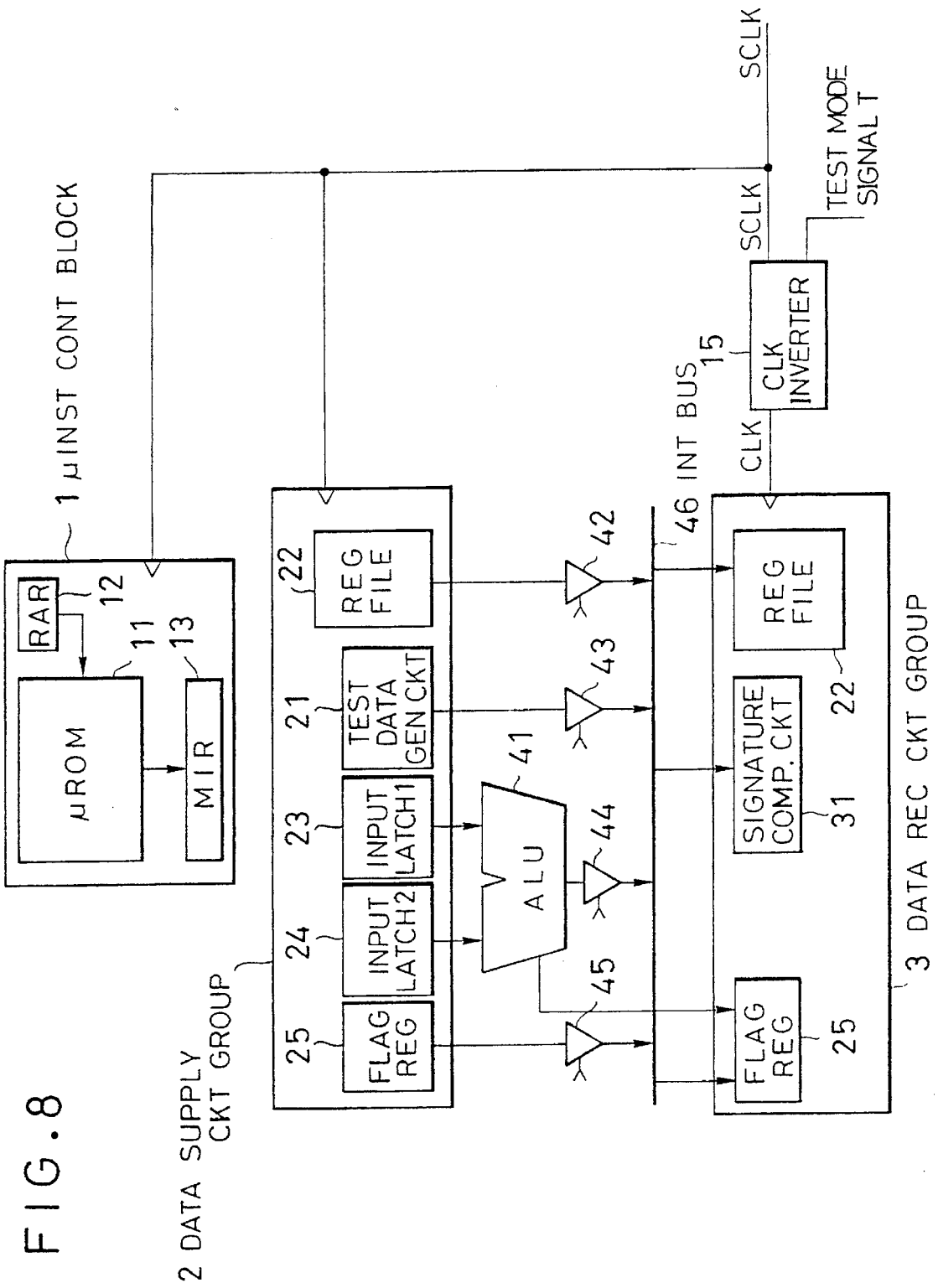
FIG. 8 is a block diagram showing an information processing system provided with a second embodiment of the self-diagnosing circuit according to the present invention.

When the μROM 11 in the microinstruction control block 1 shown in FIG. 8 is not a precharged type circuit, the circuit blocks in the system to be precharged in the high-level period of the system clock SCLK do not need evaluation of the test operation mode (T=1). In this case, the AC performance of the circuit blocks of a precharged type is accurately measured in the normal operation mode (T=0) by setting the period of the low level less than that of the high level in the system clock signal SCLK.

However, when the μROM 11 is a precharged type circuit block precharged in the high level period of the system clock SCLK, the AC performance of a circuit block of the same precharged type circuit as the μROM 11 is tested only within the AC performance of the μROM 11.

Thus, when a large scale circuit block for limiting the AC performance in the microinstruction control block is a precharged type circuit, the method of the first embodiment shown in FIG. 4 must be used to accurately evaluate the AC performance of a high speed circuit block which is also a precharged type circuit. In this case, the method of the second embodiment according to the present invention is not suitable.

Further, the third embodiment according to the present invention is explained. in the embodiment, two clock pins can be provided to input the clock signals SCLK, SCLK1, and SCLK2 instead of the clock pin in FIG. 8 in the second embodiment.

In this case, one input pin is connected to the microinstruction control portion 1 and the test data supplying circuit group 3, the other pin to the data receiving circuit group 2. In the normal operation mode, the system clock signal SCLK is provided to the two input pins, and in the test operation mode, the clock signal SCLK1 is supplied to the first input pin, and the clock signal SCLK2 which is out of phase with the clock signal SCLK1 by a delay of less than one cycle of the clock signal SCLK1 (not shown) is supplied to the second output pin.

However, in the third embodiment, there is the problem that the number of external pins is greater than in the first and the second embodiments, and it is relatively difficult to control the clock skew.

With respect to the test microprograms for the self-test described in the first, second and third embodiments, care must be taken to effectively measure the AC performance of the respective circuit blocks. That is, the self-test microprograms must be formed into modules so as to test the respective circuit blocks individually and independently. However, this does not raise a serious problem in coding the self-test microprograms.

Further, in order to evaluate the AC performance of the large scale circuit block (e.g. μROM) itself in the microinstruction control block 1, a simple self-test (e.g. the RAR 12 is counted up and the MIR 13 is used as a signature compressor) must be adopted, without depending upon the above-mentioned microinstruction controlled self-test technique. In this simple self-test, since the operation must be executed in accordance with the basic clock signal, the second self-test operation mode must be provided in addition to the aforementioned self-test operation mode (T=1) in such a way that the self-test is executed in this additional test mode, which also does not raise a serious problem in practice.

The fourth embodiment of the present invention will be described hereinbelow, in which the microinstruction control block 1 does not includes a precharged-type circuit. In this embodiment, since no precharging operation is required for the microinstruction control block 1, it is unnecessary to generate the precharging clock signal for which the cycle time is twice as long as that of the system clock. Therefore, the same function as the clock timing generating circuit 5 shown in FIG. 4 can be easily obtained by providing a waiting state for activating signals for each circuit block.

In practice, as shown in FIG. 9 by way of example, there is additionally provided such a function that input activating signals $EN_R$ and $EN_M$ for the RAR 12 and MIR 13 in the normal operation mode are replaced by input activating signals $EN_{R'}$ and $EN_{M'}$, updated every two cycles of the system clock signal SCLK in response to the self-test operation mode signal T=1. In this function, the output activating signal of the data supplying circuit group 2 given on the basis of the decoded results of data stored in the MIR 13 has a period twice as long as that of the system clock SCLK.

Further, in Pig. 9, though the RAR 12 and the MIR 13 are updated every two system clock cycles in the self-test operation mode, since there exists no case where the microinstruction control block 1 is in a waiting state due to state transitions in the self-test mode, no specific problem arises in the RAR 12 and the MIR 13. Further, in FIG. 9, a D-type flip-flop 71 is reset in response to an external signal RESET applied at the start of the self-test operation in order to determine the execution timing of the self-test relative to the clock SCLK.

Figure 10:
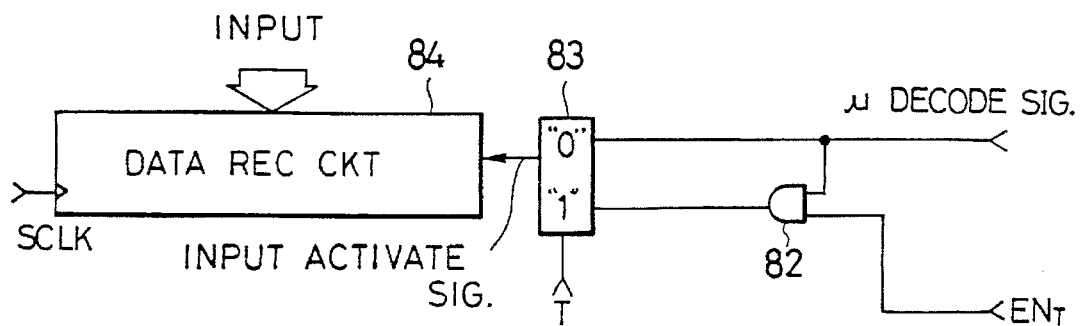
FIG. 10 is a partial block diagram for assistance in explaining the operation of the data receiving circuit as a function block of the information processing system provided with the fourth embodiment of the self-diagnosing circuit of the present invention.

On the other hand, to receive a resultant data only in one system clock cycle after a microinstruction and data are supplied, as shown in FIG. 10, at T=1, the activating signal applied to the data receiving circuit 84 can be obtained by selecting the microdecoded signal by the multiplexer 83 which inputs the microdecode signal and a signal obtained by an AND gate 82 which inputs a signal $EN_T$ (also shown in FIG. 9) and the microdecoded signal.

As described above, in the four embodiments, it is possible to measure the AC performance of the objective circuit blocks to be self-tested up to a sufficiently high range in practice beyond the AC performance of the microinstruction control block 1, by providing simple hardware for generating an appropriate clock timing in addition to the hardware required to execute the microinstruction controlled self-test for a plurality of circuit blocks connected to the internal bus 46 and controlled in accordance with microinstructions, thus providing effective fault diagnosis and failure analysis. In particular, the present invention can contribute to quick development and a short time to mass production of complicated full-custom-made VLSIs mainly depending upon microinstruction control such as CISC type microprocessors.

Further, the present invention is not limited to only the above embodiments. Where the overall system operation speed is determined by the AC performance of some control logic in the normal operation mode without including the microinstruction controlled self-test function, the present invention can be applied to this system by setting another operation mode different from the normal operation mode and by measuring the AC performance of other circuits up to a range beyond the AC performance of the control logic.

What is claimed is:

1. A method of testing an information processing system circuit operable in a normal mode and a test operation mode, comprising:

(a) a first step of reading and decoding testing microinstructions from memory for storing testing microinstructions, in response to a first clock signal in the test operation mode;

(b) a second step of generating test data corresponding to the microinstructions decoded at the first step from a test data generating circuit, then transferring the test data to first type functional blocks to be tested, or outputting data stored in second type functional blocks, in response to a first rising edge of the first clock signal in the test operation mode; and (c) a third step of reading out test results transferred from the first type functional blocks to be tested into a data compressing circuit in order to compress the test results, or of storing test results derived from the second type functional blocks, in response to a second rising edge of second clock signal in the test operation mode, wherein (d) a cycle time of a basic clock signal for controlling the operation of the first and second type functional blocks in the normal operation mode being 1/N times (N=2, 3, ...) as short as the first and second clock signals in the test operation mode, with the second clock signal being out of phase with the first clock signal by a delay of less than one cycle of the first clock signal.

2. The method of claim 1, wherein the second clock signal is inverted in phase to the first clock signal by a delay of a half cycle of the first clock signal.

3. A method of testing an information processing system provided with a test circuit which is operable in a normal mode and a test operation mode, comprising:

(a) a first step of reading and decoding testing microinstructions from memory for storing testing microinstructions, at a rising edge of a first clock signal in the test operation mode;

(b) a second step of generating test data corresponding to the microinstructions decoded at the first step from a test data generating circuit, at the rising edge of the first clock signal, then transferring the test data to first type functional blocks to be tested or outputting data stored in second type functional blocks in the test operation mode; and (c) a third step of reading out test results transferred from the first type functional blocks at the second step into a data compressing circuit in order to compress the test results, or of storing test results derived from the test data in the first type functional blocks, at the falling edges of the first clock signal in the test operation mode, wherein (d) a cycle time of a basic clock signal for controlling the operation of the first and second type functional blocks in the normal operation mode being substantially the same as that of the first clock signal, the cycle time of the basic clock signal for controlling the operation of the first and second type functional blocks in the normal operation mode being 1/N times (N=2, 3, ...) as short as the first and second clock signals in the test operation mode, With the second clock signal being inverted in phase to the first clock signal by a delay of less than one cycle of the first clock signal.

4. An information processing system composed of a plurality of circuit blocks to be tested by a test, operative in a first operation mode and in a second operation mode, comprising:

(a) clock signal generating means for generating a basic clock signal from a clock input signal in the first operation mode, a first clock signal with a cycle time N times (N=2, 3 ...) as long as than that of the basic clock signal, and a second clock signal out of phase with the first clock signal by a delay of less than one cycle of the first clock signal from the clock input signal in the second operation mode;

(b) memory means for storing microinstructions for testing, operative in synchronism with the basic clock signal in the first operation mode, and in synchronism with the first clock signal in the second operation mode;

(c) decoding means for receiving and decoding from the memory means in the second operation mode the microinstructions;

(d) test data generating means for generating test data in accordance with the decoded results obtained by said decoding means in synchronism with the first clock signal in the second operation mode;

(e) first type circuit blocks operative in synchronism with the basic clock signal in the first operation mode, for receiving test data generated by said test data generating means in synchronism with the second clock signal and outputting the test data therein in synchronism with the first clock signal in the second operation mode, (f) second type circuit blocks for receiving the test data generated by the data generating means in synchronism with the second clock signal, and for outputting output data in response to the data provided in synchronism with the basic clock signal in the first operation mode, and for outputting test result data in response to the test data provided from the test data generating means in synchronism with the first clock signal in the second operation mode; and (g) signature compressing means for receiving the test result data output from said first and second circuit blocks in order to test the operation of said first and second circuit blocks, in synchronism with the basic clock signal in the first operation mode, and in synchronism with the second clock signal in the second operation mode.

5. The information processing system of claim 4, wherein the second clock signal is out of phase with the first clock signal by a delay of ½ cycle of the first clock signal.

6. An information processing system composed of a plurality of circuit blocks to be tested by a test, operative in a first operation mode and in a second operation mode, comprising:

(a) clock signal generating means for generating a basic clock signal from a clock input signal in the first operation mode, and the basic clock signal and an inversion clock signal to the basic clock signal;

(b) memory means for storing microinstructions for testing, operative in synchronism with the basic clock signal in the first operation mode and the second operation mode;

(c) decoding means for receiving the microinstruction and decoding the microinstructions for testing stored in said memory means, (d) test data generating means for generating test data in accordance with decoded results obtained by said decoding means in synchronism with the basic clock signal in the first operation mode and the second operation mode;

(e) first type circuit blocks operative in synchronism with the basic clock signal in the first operation mode, for receiving test data generated by said test data generating means in synchronism with the inverted clock signal of the basic clock signal and outputting test data therein in synchronism with the basic clock signal in the second operation mode;

(f) second type circuit blocks for receiving the test data generated by the data generating means in synchronism with the inverted clock signal, and for outputting output data in response to the data provided in synchronism with the basic clock signal in the first operation mode and for outputting test result data in response to the test data provided from the test data generating means in synchronism with the basic clock signal in the second operation mode; and (g) signature compressing means for receiving the test result data output from said first and second circuit blocks in order to test the operation of said first and second circuit blocks, in synchronism with the basic clock signal in the first operation mode, and in synchronism with the inverted clock signal of the basic clock signal in the second operation mode.

7. An information processing system composed of a plurality of circuit blocks operative in a first operation mode and in a second operation mode, comprising:

(a) two external clock input terminals for receiving a basic clock signal in the first operation mode, and one terminal for receiving a first clock signal and the other terminal for inputting a second clock signal which is out of phase with the first clock signal by a delay of less than one cycle of the first clock signal;

(b) memory means for storing microinstructions for testing, operative in synchronism with the basic clock signal in the first operation mode, and in synchronism with the first clock signal in the second operation mode;

(c) decoding means for receiving and decoding the microinstructions for testing stored in said memory means;

(d) test data generating means for generating test data in accordance with the decoded results obtained by said decoding means in synchronism with the first clock signal in the second operation mode;

(e) first type circuit blocks operative in synchronism with the basic clock signal in the first operation mode, for receiving test data generated by said test data generating means in synchronism with the second clock signal and outputting test data therein in synchronism with the first clock signal in the second operation mode, (f) second type circuit blocks for receiving the test data generated by the data generating means in synchronism with the second clock signal, and for outputting output data in response to the data provided in synchronism with the basic clock signal in the first operation mode and for outputting test result data in response to the test data provided from the test data generating means in synchronism with the first clock signal in the second operation mode; and (g) signature compressing means for receiving the test result data output from said first and second circuit blocks in order to test the operation of said first and second circuit blocks, in synchronism with the basic clock signal in the first operation mode, and in synchronism with the second clock signal in the second operation mode.

8. An information processing system operative in a first operation mode and in a second operation mode, comprising:

first means for outputting test data in synchronism with a first clock signal in the first operation mode and in synchronism with a second clock signal in the second operation mode; and a circuit block to be tested for receiving the test data from the first means and outputting result data in the second operation mode; and second means for inputting the result data from the circuit block in synchronism with the first clock signal in the first operation mode, and operative in synchronism with a third clock signal in the second operation mode, wherein the third clock signal is out of phase with the second clock signal by a delay of less than one cycle of the first clock signal.

9. An information processing system of claim 8, wherein the second clock signal is identical in phase with the first clock signal.

10. An information processing system operative in a first operation mode and in a second operation mode, comprising:

first means for outputting test data in synchronism with a first clock signal in the first operation mode, and operative in synchronism with a second clock signal in the second operation mode;

a circuit block to be tested for receiving the test data from the first means and outputting test result data; and second means for receiving the test result data from the circuit block in synchronism with the first clock signal in the first operation mode and in synchronism with a third clock signal in the second operation mode, wherein the second clock signal is out of phase with the third clock signal by a delay of less than one of the third clock signal.

11. An information processing system of claim 10, wherein the third clock signal is identical in phase with the first clock signal.

12. The information processing system of claim 4, wherein the clock signal generating means further comprises:

a D-type flip-flop having a D input connected to an inverted Q output and a clock input receiving the basic clock signal;

a first multiplexer for generating the first clock signal having a first input terminal corresponding to a "1" state connected to a Q output of the D-type flip-flop and a second input terminal corresponding to a "0" state receiving the basic clock signal; and a second multiplexer for generating the first clock signal having a first input terminal corresponding to a "1" state connected to the inverted Q output of the D-type flip-flop and a second input terminal corresponding to a "0" state receiving the basic clock signal.

\* \* \* \* \*